M. E. HIGGINS.
FLOUR SIFTER.
APPLICATION FILED MAR. 25, 1908.
945,950.
Patented Jan. 11, 1910.
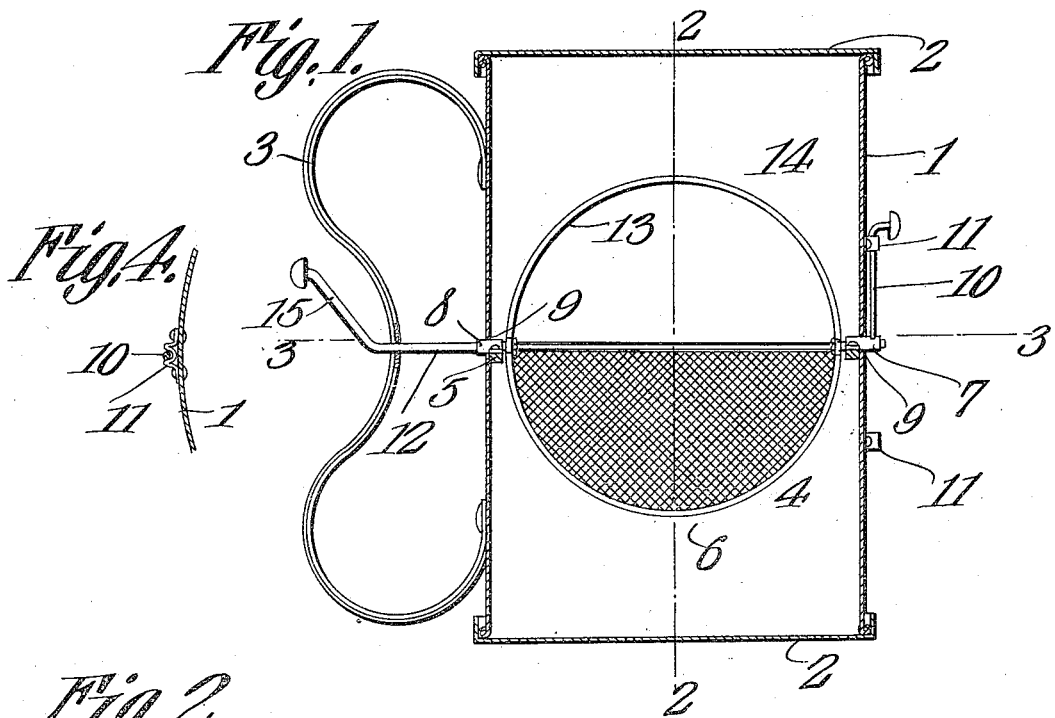
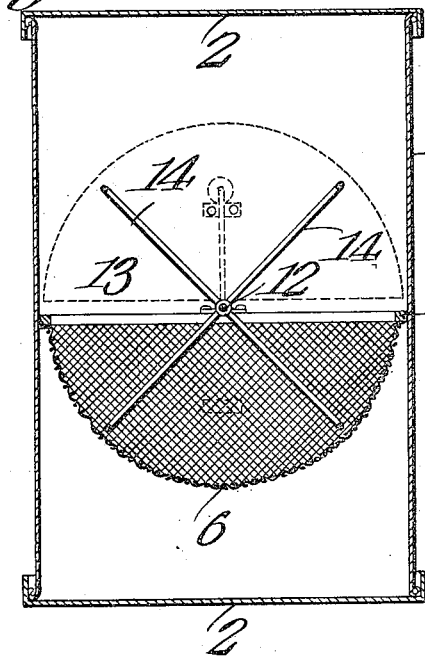
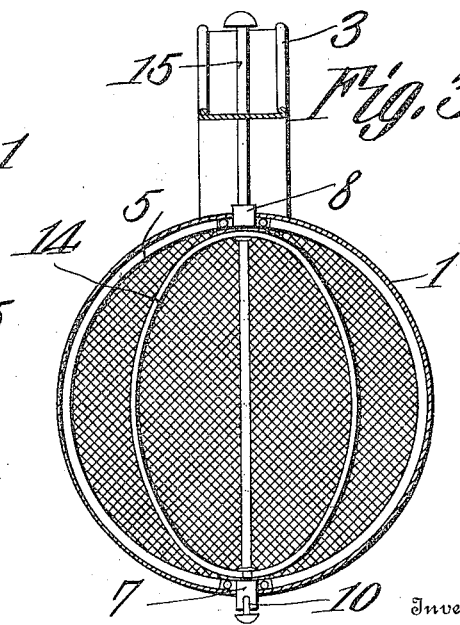
Witnesses
Inventor
Mary E. Higgins.
By
Attorneys

UNITED STATES PATENT OFFICE.

MARY E. HIGGINS, OF PORT HURON, MICHIGAN.

FLOUR-SIFTER.

945,950.

Specification of Letters Patent. Patented Jan. 11, 1910.

Application filed March 25, 1908. Serial No. 423,212.

*To all whom it may concern:*

Be it known that I, MARY E. HIGGINS, a citizen of the United States, residing at Port Huron, in the county of St. Clair and State of Michigan, have invented a new and useful Flour-Sifter, of which the following is a specification.

This invention relates primarily to a flour sifter for domestic purposes; and has for its object to provide a utensil for the purpose described, by means of which flour, meal and similar substances may be sifted again and again within the confines of the utensil without loss and with great rapidity. To attain this result an open cylindrical body is provided with a removable closure at each end, a centrally disposed reversible sieve, and revoluble beater within the sieve, both sieve and beater having a handle without the body by means of which the said parts are operated.

The salient feature of the invention resides in the specific locking means employed for holding the sieve in the position to which it is rotated, it being rotated through the medium of a resilient wire reversing arm which is engageable with either one of a pair of lugs secured upon the outer surface of the body of the sifter.

In the accompanying drawings: Figure 1 is a vertical longitudinal sectional view of the improved sifter; Fig. 2 a similar view on the line 2—2 of Fig. 1; Fig. 3 a horizontal sectional view on the line 3—3 of Fig. 1; and Fig. 4 a detail view.

Similar reference numerals are used for the same parts on all the figures.

Referring to the drawing; 1 indicates a hollow cylindrical body made of sheet metal or other suitable material of any convenient length and diameter having a removable closure 2 at each end in the nature of a flanged cap, and a handle 3 fastened to the side of the cylinder, which handle may resemble that illustrated, or be of any other desired form. Within the body 1 is a sieve 4 comprising a ring or annulus 5 of substantially the same diameter as the interior of the body secured to the edge of a segmental or hemispherical cup 6 of reticulated material such as woven wire. Secured to the ring on diametrically opposite sides are two horizontally projecting tubular trunnions or journals 7 and 8 rotatably mounted in perforations 9 formed through opposite sides of the body 1 midway between its ends.

The trunnion 7 extends sufficiently far beyond the side of the body to receive an operating crank or handle 10 by means of which the sieve can be reversed or rotated, to make either end of the body 1 temporarily the bottom of the sifter. Some means must be employed to hold the sieve fixed in both operative positions, one such means being that shown in the drawing, which consist of lugs 11 projecting from the side of the body 1 on opposite sides of the tubular journal 7 and in such position that the handle or crank 10 shall enter a notch in either of said lugs when it is desired to lock the sieve fixed. The handle or crank 10 is preferably made resilient so that it will normally remain in the notch, but may be easily withdrawn when the sieve is to be reversed.

Journaled in the tubular trunnions 7 and 8 is a shaft 12 on which is mounted a beater 13 made of a plurality of curved arms 14 adapted to successively enter the sieve when the shaft is revolved and stir the contents therein, forcing the material through the reticulated cup 6 into the bottom of the sifter. The beater arms 14 are shaped to conform with the curvature of the sieve and travel in contact therewith or closely thereto. The shaft 12 projects through the trunnion 8 and is provided with a crank 15 by means of which the beater is rotated. In the construction shown in the drawing the shaft 12 passes through an opening in the handle 3, so that the latter forms an additional bearing for said shaft but with a different form of handle or a different disposition thereof on the body this would not be necessary. The closures 2 are preferably alike and may be used without discrimination on either end.

When flour or other material is to be sifted but once, the lower closure 2 is removed and the crank 15 rotated in the usual manner. But, if it be necessary or desirable to sift the material more than once, both ends of the sifter are closed after the material has been placed therein and all the material sifted into the bottom of the utensil. The crank or handle 10 is then disengaged from the lug 11 on one side of the journal 7 and engaged with the notch in the other lug 11 on the opposite side thereof. This half revolution of the handle 10 reverses the position of the sieve so that when the sifter is turned over the crank 15 may be at once operated and resift the flour.

These changes are to be repeated as many times as necessary, the last time the bottom closure may be removed and the flour sifted into the receptacle awaiting it, or the closure retained until the sifted material is needed. The reversing arm 10 is of resilient wire and the lugs 11 are in the nature of short strips of sheet metal which are crimped between their ends to form notches or seats to receive the arm 10 it being understood of course that prior to engagement of the arm in the notch formed by the crimp in either one of the lugs 11, the arm must spring in a direction away from the body of the sifter to a slight degree.

It is to be understood that while the embodiment of the invention herein described and shown is the best known at the present time, various changes and modifications of the structure may be made without departing from the spirit of the invention as disclosed in the claim.

Having described my invention, what I claim as new and desire to secure by Letters Patent is:—

In a flour sifter, a reversible cylindrical casing having closely fitting covers at each end and provided at one side with a handle, a foraminous sifter of approximately hemispherical form disposed centrally within the casing and provided with diametrically opposed hollow trunnions, said casing being formed with openings in which the trunnions are journaled, a revoluble beater having journal studs having bearings in said trunnions, one of said studs being extended to afford a handle by which the said beater may be revolved, a resilient wire arm secured at one end to one of the trunnions and projecting radially therefrom, the other end of the said arm being bent in a direction outwardly from the casing, and provided with a finger-knob, rotation of the arm serving to reverse the sifter, and means for holding the arm in position to have the convex side of the sifter presented toward one or the other of the ends of the cylindrical casing, said holding means comprising locking lugs arranged one intermediate of each end of the casing and the point of location of the opening in which the hollow trunnion, to which the resilient reversing arm is connected is journaled, each of said locking lugs consisting of a strip of sheet metal having spaced crimped portions, and having its extremities beyond the crimped portions secured to the wall of the cylindrical casing, the said crimps projecting in a direction outwardly from the wall of the casing and being arranged to receive between them a portion of the resilient reversing arm, the said lugs being also resilient.

In testimony that I claim the foregoing as my own, I have hereto affixed my signature in the presence of two witnesses.

MARY E. HIGGINS.

Witnesses:
E. A. CODY,
C. HODDER.